United States Patent
Chen et al.

(10) Patent No.: US 12,362,574 B2
(45) Date of Patent: Jul. 15, 2025

(54) CHARGING AND DISCHARGING CONTROL METHOD, AND DEVICE

(71) Applicant: GUANGDONG OPPO MOBILE TELECOMMUNICATIONS CORP., LTD., Dongguan (CN)

(72) Inventors: Shebiao Chen, Dongguan (CN); Hongbin Xie, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 544 days.

(21) Appl. No.: 17/475,162

(22) Filed: Sep. 14, 2021

(65) Prior Publication Data
US 2022/0006303 A1 Jan. 6, 2022

Related U.S. Application Data

(63) Continuation of application No. PCT/CN2019/079345, filed on Mar. 22, 2019.

(51) Int. Cl.
*H02J 7/00* (2006.01)
*H01M 4/38* (2006.01)
(Continued)

(52) U.S. Cl.
CPC ........... *H02J 7/0014* (2013.01); *H01M 4/386* (2013.01); *H01M 4/587* (2013.01);
(Continued)

(58) Field of Classification Search
CPC .............................. H02J 7/0019; H02J 7/0014
See application file for complete search history.

(56) References Cited

U.S. PATENT DOCUMENTS

2006/0164038 A1 7/2006 Demers et al.
2011/0156649 A1* 6/2011 Wu ..................... H02J 7/00308
320/118

(Continued)

FOREIGN PATENT DOCUMENTS

CN 201750186 U 2/2011
CN 102110997 A 6/2011
(Continued)

OTHER PUBLICATIONS

The Second Office Action dated Apr. 26, 2024 from Chinese patent application No. 201980093040.6.
(Continued)

*Primary Examiner* — Julian D Huffman
*Assistant Examiner* — Sadia Kousar
(74) *Attorney, Agent, or Firm* — BAYES PLLC

(57) ABSTRACT

The present disclosure discloses a method for charging and discharging control, and a device. The method can be applied to a device. The device includes a first battery unit and a second battery unit which are connected in series, and a balance module. The second battery unit supplies power for the device. The method includes, when the voltage of the second battery unit is equal to or less than a first preset voltage threshold, transferring the power in the first battery unit to the second battery unit through the balance module, such that the voltage of the second battery unit is greater than the first voltage threshold.

6 Claims, 7 Drawing Sheets

(51) Int. Cl.
    *H01M 4/587* (2010.01)
    *H01M 10/0525* (2010.01)
    *H01M 10/42* (2006.01)
    *H01M 10/44* (2006.01)
    *H01M 10/48* (2006.01)
    *H01M 4/02* (2006.01)

(52) U.S. Cl.
    CPC ... *H01M 10/0525* (2013.01); *H01M 10/4257* (2013.01); *H01M 10/441* (2013.01); *H01M 10/482* (2013.01); *H02J 7/0047* (2013.01); *H02J 7/007182* (2020.01); *H01M 2004/027* (2013.01); *H01M 2010/4271* (2013.01)

(56) References Cited

U.S. PATENT DOCUMENTS

| | | | |
|---|---|---|---|
| 2013/0021000 A1* | 1/2013 | Kuraishi | H02J 7/0016 320/118 |
| 2014/0145669 A1 | 5/2014 | Wortham | |
| 2016/0072316 A1 | 3/2016 | Barsukov et al. | |
| 2018/0248385 A1 | 8/2018 | Zhang et al. | |
| 2018/0301912 A1* | 10/2018 | Shen | H02J 7/0019 |

FOREIGN PATENT DOCUMENTS

| | | |
|---|---|---|
| CN | 102593900 A | 7/2012 |
| CN | 104934648 A | 9/2015 |
| CN | 107231021 A | 10/2017 |
| CN | 107785961 A | 3/2018 |
| CN | 207968087 U | 10/2018 |
| JP | 2004265718 A * | 9/2004 |
| JP | 2013037863 A * | 2/2013 |

OTHER PUBLICATIONS

The Extended European Search Report Dated Feb. 22, 2022 from European Application No. 19921387.7, 9 pages.
The First Office Action dated Jul. 22, 2023 from Chinese patent application No. 201980093040.6.
International Search Report and the Written Opinion Dated Dec. 25, 2019 From the International Searching Authority Re. Application No. PCT/CN2019/079345.

* cited by examiner

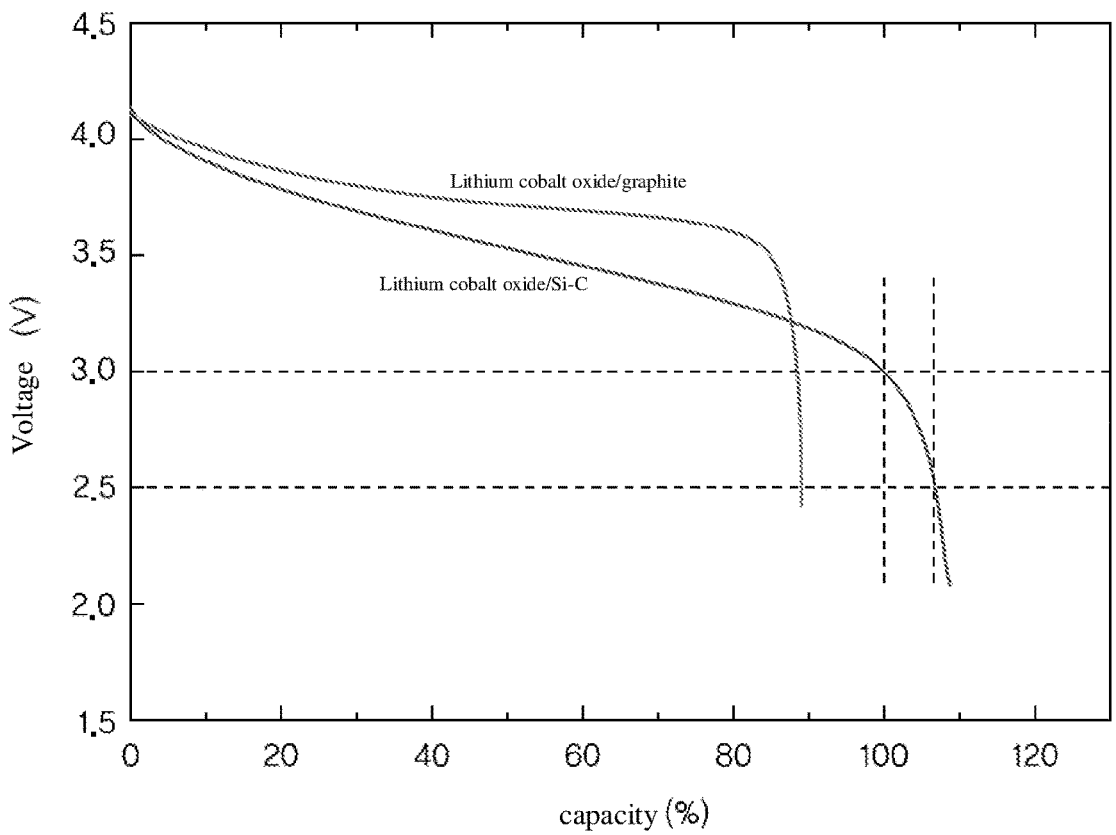

FIG. 6

10 when the voltage of the second battery unit is equal to or less than the preset first voltage threshold, the balance module transfers the power in the first battery unit to the second battery unit, such that the voltage of the second battery unit is greater than the first voltage threshold — S102 when the voltage of the first battery uint is equal to or less than the preset second voltage threshold, the second battery uint is stopped from discharging — S104 after the second battery uint stops discharging, the voltage of the first battery unit and the second battery unit are balanced by the balance module, such that the voltage of the first battery unit is equal to the voltage of the second battery unit — S106

| S102: when the voltage of the second battery unit is equal to or less than the preset first voltage threshold, the balance module transfers the power in the first battery unit to the second battery unit, such that the voltage of the second battery unit is greater than the first voltage threshold |

↓

| S104: when the voltage of the first battery uint is equal to or less than the preset second voltage threshold, the second battery uint is stopped from discharging |

↓

| S106: after the second battery uint stops discharging, the voltage of the first battery unit and the second battery unit are balanced by the balance module, such that the voltage of the first battery unit is equal to the voltage of the second battery unit |

↓

| S202: after the charging of the first battery unit and the second battery unit is cut off, the voltages of the first battery unit and the second battery unit are balanced by the balance module, such that the voltage of the first battery unit is equal to that of the second battery unit. |

| when the voltage of the second battery unit is greater than the preset first voltage threshold, the second battery unit supplies power to the device to be charged | S302 |

| when the voltage of the second battery unit is less than the first voltage threshold, the first battery unit supplies power to the device to be charged, when the voltage of the first battery unit is equal to or less than the first voltage threshold, the supply voltage output by the first battery unit is boosted by the voltage conversion circuit, such that the supply voltage is greater than the first voltage threshold | S304 |

| when the voltage of the first battery unit is equal to or less than the preset second voltage threshold, the first battery unit is stopped from discharging | S306 |

| after the first battery uint stops discharging, the voltages of the first battery uint and the second battery uint are balanced by the balance module, such that the voltage of the first battery uint is equal to the voltage of the second battery unit | S308 |

FIG. 9

CHARGING AND DISCHARGING CONTROL METHOD, AND DEVICE

CROSS-REFERENCE TO RELATED APPLICATION

This application is a continuation of International Application No. PCT/CN2019/079345, filed on Mar. 22, 2019, the entire contents of which are incorporated herein by reference.

BACKGROUND

The present disclosure relates to a field of battery charging and discharging technology, and more particularly, to a charging and discharging control method, and a device.

At present, most of the commonly used power supply and energy storage devices are lithium-ion batteries, and graphite anodes are the most used. Although graphite anodes have the advantages of low cost and low lithium insertion potential, with the continuous enhancement of functions such as smart terminals and electric vehicles in recent years, use strength and requirements for batteries have also been further improved. For example, wireless Internet access, high-speed data transmission, using Bluetooth to connect to smart homes and video transmission, etc., especially with the application of 5G networks, put forward higher requirements for the battery power of smart terminals.

In mainstream graphite system lithium-ion batteries used in smart terminals currently, the energy density of batteries is generally in the range of 500~700 Wh/L, and the charging rate of batteries is generally in the range of about 0.5-3 C, which is gradually unable to meet users' endurance requirements for a smart terminal. Although the current mainstream cathode material is high-voltage lithium cobalt oxide, which greatly affects the energy density of smart terminal batteries, the specific capacity of the anode also determines nearly half of the specific capacity of the batteries. The actual available capacity of the battery is also related to the tilt of the negative electrode delithiation voltage platform. The flatter the delithiation voltage platform, the higher the available capacity of the negative electrode, and the higher the specific capacity of the battery.

The theoretical specific capacity of the traditional graphite cathode is about 372 mAh/g, and the lithium insertion voltage is about 0.05V. Since silicon can form a multi-phase alloy LixSi with lithium, it has a theoretical specific capacity of about 3600 mAh/g at room temperature, which is much greater than the theoretical specific weight of the graphite anode, and the lithium insertion voltage is also 0.4V. It can be seen that the silicon anode will be a development direction to improve the energy density of lithium-ion batteries at the anode level in the future.

The foregoing information disclosed in the background section is used only for enhancing the understanding of the background to be disclosed, and therefore it may include information that does not constitute a prior art known to the persons skilled in the art.

SUMMARY

In view of this, the present disclosure provides a charging and discharging control method, and a device.

Additional features and benefits of this disclosure will become apparent through the detailed description below, or will be acquired in part through the practice of this disclosure.

According to one aspect of the present disclosure, a charging and discharging control method is provided, which is applied to a device, and the device includes a first battery unit and a second battery unit connected in series, and a balance module, wherein the second battery unit supplies power for the device; the method includes transferring the power in the first battery unit to the second battery unit through the balance module when voltage of the second battery unit is equal to or less than a preset first voltage threshold, such that the voltage of the second battery unit is greater than the first voltage threshold.

According to an embodiment of the present disclosure, the first battery unit is a lithium ion battery with a silicon negative electrode.

According to an embodiment of the present disclosure, the second battery unit is a lithium ion battery with a graphite negative electrode.

According to an embodiment of the present disclosure, the method further includes stopping the discharge of the second battery unit when voltage of the first battery unit is equal to or less than a preset second voltage threshold.

According to an embodiment of the present disclosure, the method further includes balancing the voltages of the first battery unit and the second battery unit by the balance module after the charging of the second battery unit has been stopped, such that the voltage of the first battery unit is equal to the voltage of the second battery unit.

According to an embodiment of the present disclosure, the method further includes balancing the voltage of the first battery unit and the second battery unit through the balance module after the charging of the first battery unit and the second battery unit has been cut off, so that the voltage of the first battery unit is equal to the voltage of the second battery unit.

According to another aspect of the present disclosure, a charging and discharging control method is provided, which is applied to a device, the device includes a first battery unit and a second battery unit connected in series, and a voltage conversion circuit; the method includes supplying power to the device through the second battery unit when voltage of the second battery unit is greater than a preset first voltage threshold; supplying power to the device through the first battery unit when voltage of the first battery unit is equal to or less than the preset first voltage threshold, and boosting supply voltage output by the first battery unit through the voltage conversion circuit when the voltage of the first battery unit is equal to or less than the preset first voltage threshold, such that the supply voltage is greater than the preset first voltage threshold.

According to an embodiment of the present disclosure, the first battery unit is a lithium ion battery with a silicon negative electrode.

According to an embodiment of the present disclosure, the second battery unit is a lithium ion battery with a graphite negative electrode.

According to an embodiment of the present disclosure, the method further includes stopping the discharge of the second battery unit when voltage of the first battery unit is equal to or less than a preset second voltage threshold.

According to an embodiment of the present disclosure, the device further includes a balance module, the method further including balancing the voltages of the first battery unit and the second battery unit by the balance module after the charging of the second battery unit has been stopped, such that the voltage of the first battery unit is equal to the voltage of the second battery unit.

According to an embodiment of the present disclosure, the method further includes balancing the voltage of the first battery unit and the second battery unit through the balance module after the charging of the first battery unit and the second battery unit has been cut off, so that the voltage of the first battery unit is equal to the voltage of the second battery unit.

According to another aspect of the present disclosure, a device is provided, including a first battery unit and a second battery unit connected in series, wherein the second battery unit is configured to charge for the device; a detect circuit is electrically connected with the first battery unit and the second battery unit and is configured to detect voltage of the first battery unit and the second battery unit; a balance module is electrically connected with the first battery unit and the second battery unit, and is configured to balance the voltage of the first battery unit and the second battery unit; and a control module is electrically connected with the detect circuit and the balance module, and is configured to control the balance module to transfer power in the first battery unit to the second battery, such that the voltage of the second unit is greater than a preset voltage threshold, when the detect circuit detects that the voltage of the second battery unit is equal to or less than the preset first voltage threshold.

According to an embodiment of the present disclosure, the first battery unit is a lithium ion battery with a silicon negative electrode.

According to an embodiment of the present disclosure, the second battery unit is a lithium ion battery with a graphite negative electrode.

According to an embodiment of the present disclosure, the control module is further configured to control the second battery unit to stop discharging when voltage of the first battery unit is less than and equal to a preset second voltage threshold.

According to an embodiment of the present disclosure, the control module is further configured to control the balance module to balance the voltage of the first battery unit and the second battery unit after the charging of the second battery unit has been stopped, such that the voltage of the first battery unit is equal to the voltage of the second battery unit.

According to an embodiment of the present disclosure, the control module is further configured to control the balance module to balance the voltage of the first battery unit and the second battery unit after the charging of the first battery unit and the second battery unit has been cut off, so that the voltage of the first battery unit is equal to the voltage of the second battery unit.

According to another aspect of the present disclosure, a device is provided, including a first battery unit and a second battery unit coupled in series; a voltage conversion circuit electrically connected to the first battery unit; a detect circuit electrically connected to the first battery unit and the second battery unit, the detect circuit is configured to detect voltage of the first battery unit and the second battery unit; and a control module electrically connected to the detect circuit and the voltage conversion circuit, and is configured to control the second battery unit to charge for the device when the detect circuit detects a voltage of the second battery unit is greater than a preset voltage threshold, control the first battery unit to charge for the device when the detect circuit detects the voltage of the second battery unit is equal to or less than the preset voltage threshold, and control the voltage conversion circuit to boost the supply voltage output by the first battery unit through the voltage conversion circuit when the voltage of the first battery unit is equal to or less than the preset first voltage threshold, such that the supply voltage is greater than the preset first voltage threshold.

According to an embodiment of the present disclosure, the first battery unit is a lithium ion battery with a silicon negative electrode.

According to an embodiment of the present disclosure, the second battery unit is a lithium ion battery with a graphite negative electrode.

According to an embodiment of the present disclosure, the device further includes a first switch, a second switch, a third switch and a fourth switch; wherein the first switch and the second switch are electrically connected to the first battery unit, the third switch and the fourth switch are electrically connected to the second battery unit; the control module is further configured to control to conduct the first switch and the second switch, control to turn-off the third switch and the fourth switch, such that the first battery unit supplies power for the device; and control to conduct the third switch and the fourth switch, control to turn-off the first switch and the second switch such that the second battery unit supplies power for the device.

According to an embodiment of the present disclosure, the control module is further configured to control the first battery unit to stop discharging when the detect circuit detects the voltage of the first battery unit is equal to the second battery unit.

According to an embodiment of the present disclosure, the device further includes a balance module electrically connected to the first battery unit, the second battery unit and the control module, is configured to balance voltage of the first battery unit and the second battery unit; the control module is further configured to control the balance module to balance voltage of the first battery unit and the second battery unit after the charging of the first battery unit has been stopped, such that the voltage of the first battery unit is equal to the voltage of the second battery unit.

According to an embodiment of the present disclosure, the control module is configured to control the balance module to balance the voltage of the first battery unit and the second battery unit after the charging of the first battery unit and the second battery unit has been cut off, so that the voltage of the first battery unit is equal to the voltage of the second battery unit.

According to the charging and discharging control method provided by the embodiments of the present disclosure, it is possible to make full use of the large capacity advantages of the silicon negative electrode lithium ion battery without changing the existing discharge circuit, to improve the battery capacity of the silicon negative electrode lithium ion battery as much as possible, and to maximize the energy density of the battery in the device.

It should be understood that the above general descriptions and the subsequent detailed descriptions are illustrative only and do not limit to this disclosure.

BRIEF DESCRIPTION OF THE DRAWINGS

The above and other objectives, features, and advantages of the present disclosure will become more apparent by describing its exemplary embodiments in detail with reference to the accompanying drawings.

FIG. 6 is a comparison diagram of discharge curves of a lithium ion battery with a silicon negative electrode and a lithium ion battery with a graphite negative electrode.

FIG. 7 is a flowchart of a charging and discharging control method according to an exemplary embodiment.

FIG. 8 is a flowchart of another charging and discharging control method according to an exemplary embodiment.

FIG. 9 is a flowchart of another method of charging and discharging control according to an exemplary embodiment.

DETAILED DESCRIPTION

Figure 1:
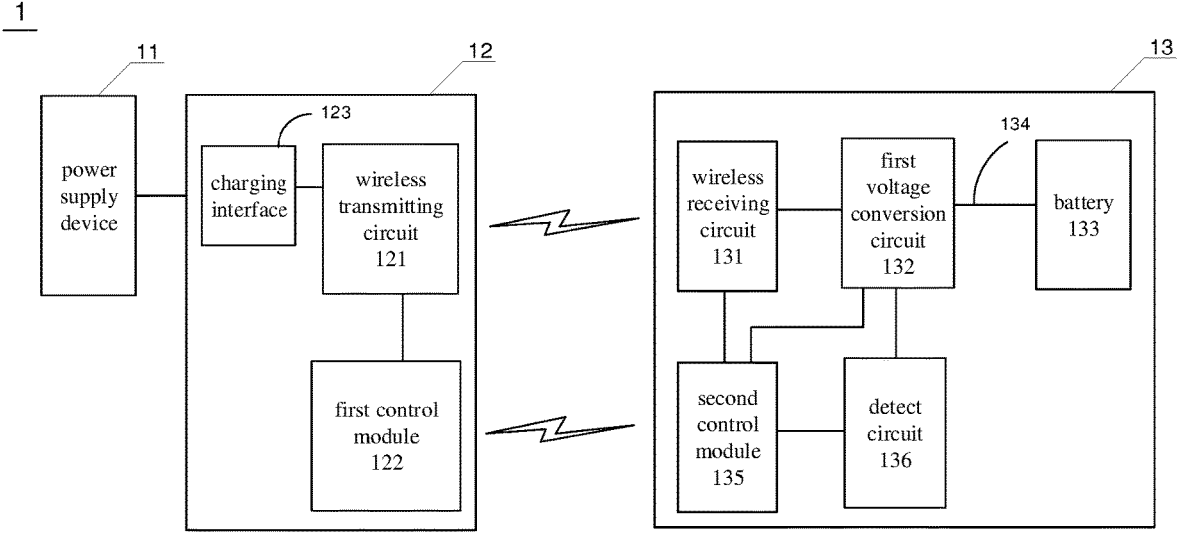
FIG. 1 is a system structure diagram of a wireless charging system according to an exemplary embodiment.

Example embodiments will now be described more fully with reference to the accompanying drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The drawings are only schematic illustrations of the present disclosure and are not necessarily drawn to scale. The same reference numerals in the figures denote the same or similar parts, and thus their repeated description will be omitted.

Furthermore, the described features, structures or characteristics can be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, etc., can be used. In other cases, well-known structures, methods, devices, implementations, materials, or operations are not shown or described in detail to avoid overwhelming people and obscure all aspects of the present disclosure.

In the present disclosure, unless otherwise clearly defined and defined, the terms "connected," "connected" and other terms should be understood in a broad sense. For example, they may be fixedly connected, detachably connected, or integrated; it may be Electrical connection can also be mutual communication; it can be directly connected or indirectly connected through an intermediate medium. For those of ordinary skill in the art, the specific meaning of the above-mentioned terms in the present disclosure can be understood according to specific circumstances.

In addition, in the description of the present disclosure, "plurality" means at least two, such as two, three, etc., unless otherwise specifically defined. "And/or" describes the association relationship of the associated objects, indicating that there can be three relationships, such as A and/or B, which can indicate the existence of A alone, B alone, and both A and B. The symbol "/" generally indicates that the associated objects are in an "or" relationship. The terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features.

First, the current battery charging process is described here.

The battery charging process may include a trickle charging stage (or mode), a constant current charging stage (or mode), a constant voltage charging stage (or mode), and a supplementary charging stage (or mode). In the trickle charging stage, the fully discharged battery is precharged (i.e., restorative charging). The current in the trickle charging stage is usually one-tenth of the current in the constant current charging stage. When the battery voltage rises above the current threshold in the trickle charging stage, increase the charging current and enter the constant current charging stage. In the constant current charging stage, the battery is charged with a constant current, and the charging voltage rises rapidly. When the charging voltage reaches the expected charging voltage threshold of the battery, it will enter the constant voltage charging stage. In the constant voltage charging stage, the battery is charged with a constant voltage, and the charging current gradually decreases; when the charging current drops to the preset current threshold (the preset current threshold is usually one-tenth or less of the charging current value in the constant current charging stage, optionally, the preset current threshold can be tens of milliamps or less), the battery is fully charged. After the battery is fully charged, due to the influence of the battery's self-discharge, some current loss will occur. At this time, it will enter the supplementary charging stage. In the supplementary charging stage, the charging current is very small and just to ensure that the battery is at full capacity.

It should be noted that the constant current charging stage does not require the charging current to remain completely constant. For example, it can generally mean that the peak or average value of the charging current remains unchanged for a period of time. In practice, the constant current charging stage can be charged in a multi-stages constant current charging stage.

The multi-stages constant current charging stage can have M constant current stages (M is an integer not less than 2), the multi-stages constant current charging stage starts the first stage charging with a preset charging current, and the M constant current stages of the multi-stages constant current charging are executed in sequence from the first stage to the M-th stage. When the previous constant current stage in the constant current charging stage turns to the next constant current stage, the current can be reduced; when the battery voltage reaches the charge termination voltage threshold, the previous constant current stage in the constant current charging stage will shift to the next constant current stage. The current conversion process between two adjacent constant current stages can be gradual or stepwise jump changes.

The wireless charging system and the wired charging system in related technologies are respectively introduced below.

In the process of wireless charging, a power supply device (such as an adapter) is generally connected to a wireless charging device (such as a wireless charging base), and the output power of the power supply device is transmitted to the device to be charged through the wireless charging device in a wireless way (such as electromagnetic signals or electromagnetic waves), and charge for the device to be charged wirelessly.

According to different principles of wireless charging, wireless charging methods are mainly divided into three methods magnetic coupling (or electromagnetic induction), magnetic resonance and radio waves. Currently, mainstream wireless charging standards include QI standard, Power Matters Alliance (PMA) standard, and Wireless Power Alliance (Alliance for Wireless Power, A4WP). Both the QI standard and the PMA standard use magnetic coupling for wireless charging. The A4WP standard uses magnetic resonance for wireless charging.

FIG. 1 is a system structure diagram of a wireless charging system according to an exemplary embodiment.

Refer to FIG. 1, the wireless charging system 1 includes a power supply device 11, a wireless charging device 12, and a device to be charged 13. The power supply device 11 may be, for example, a power adapter, a power bank, etc.; the wireless charging device 12 may be, for example, a wireless charging base; and the device to be charged 13 may be, for example, a terminal device.

After the power supply device 11 is connected to the wireless charging device 12, the output current is transmitted to the wireless charging device 12.

The wireless charging device 12 includes a wireless transmitting circuit 121 and a first control module 122.

The wireless transmitting circuit 121 is configured to convert the electrical energy output by the power supply device 11 into electromagnetic signals (or electromagnetic waves) for transmission, so as to charge wirelessly for the device to be charged 13. For example, the wireless transmitting circuit 121 may include a wireless transmitting drive circuit and a transmitting coil (or transmitting antenna). The wireless transmitting drive circuit is configured to convert the direct current output by the power supply device 11 into high frequency alternating current, and convert the high frequency alternating current into an electromagnetic signal (or electromagnetic wave) through a transmitting coil or a transmitting antenna and transmit it out.

The first control module 122 may be implemented by, for example, a micro control unit (MCU). The first control module 122 may be used to perform wireless communication with the device to be charged 13 during the wireless charging process of the device to be charged 13 by the wireless charging device 12. Specifically, the first control module 122 may perform wireless communication with the second control module 135 in the device 13 to be charged.

In addition, the wireless charging device 12 may further include a charging interface 123. The wireless transmitting circuit 121 can also be used to receive the electric energy output by the power supply device 11 through the charging interface 123, and generate an electromagnetic signal (or electromagnetic wave) according to the electric energy output by the power supply device 11.

The charging interface 123 may be, for example, a USB 2.0 interface, a Micro USB interface, or a USB TYPE-C interface. In some embodiments, the charging interface 123 may also be a lightning interface, or any other type of parallel port or serial port that can be used for charging.

The wireless charging device 12 can communicate with the power supply device 11. For example, it can communicate through the charging interface 123, without setting an additional communication interface or other wireless communication module, which can simplify the implementation of the wireless charging device 12. For example, the charging interface 123 is a USB interface, the wireless charging device 12 (or the wireless transmitting circuit 121) and the power supply device 13 can communicate based on the data lines (such as D+ and/or D− lines) in the USB interface. For another example, the charging interface 123 is a USB interface (such as a USB TYPE-C interface) that supports a power delivery (PD) communication protocol, and the wireless charging device 12 (or wireless transmitting circuit 121) and the power supply device 11 can communicate based on the PD communication protocol.

In addition, the wireless charging device 12 may also be communicatively connected to the power supply device 11 through other communication manner other than the charging interface 123. For example, the wireless charging device 12 may communicate with the power supply device 11 in a wireless manner, such as Near Field Communication (NFC).

The device to be charged 13 may be, for example, a terminal or a communication terminal. The terminal or communication terminal includes but is not limited to a device that is set to be connected via a wired line, such as via a public switched telephone network (PSTN) or a digital subscriber line (DSL), digital cable, direct cable connection, and/or another data connection/network and/or via, for example, cellular network, wireless local area network (WLAN), such as handheld digital video broadcasting (digital video broadcasting handheld, DVB-H) network of digital television network, satellite network, amplitude modulation-frequency modulation (AM-FM) broadcast transmitter, and/or the wireless interface of another communication terminal to receive/send communication signals. The communication terminal set to communicate through a wireless interface may be referred to as a "wireless communication terminal," a "wireless terminal" and/or a "mobile terminal." Examples of mobile terminals include, but are not limited to, satellite or cellular phones; personal communication system (PCS) terminals that can combine cellular radio phones with data processing, fax, and data communication capabilities; can include radio phones, pagers, and the Internet/Personal digital assistant (PDA) with intranet access, web browser, memo pad, calendar, and/or global positioning system (GPS) receiver; and conventional laptop and/or palmtop Receiver or other electronic devices including a radio telephone transceiver. In addition, the terminal can also include, but is not limited to, electronic book readers, smart wearable devices, mobile power sources (such as power banks, travel chargers), electronic cigarettes, wireless mice, wireless keyboards, wireless headphones, Bluetooth speakers, etc. Rechargeable electronic equipment.

The device to be charged 13 includes a wireless receiving circuit 131, a battery 133, a first charging channel 134 (Not shown in the figure), a second control module 135, and a detect circuit 136.

The wireless receiving circuit 131 is used to receive the electromagnetic signal (or electromagnetic wave) emitted by the wireless transmitting circuit 121, and convert the electromagnetic signal (or electromagnetic wave) into the direct current output by the wireless receiving circuit 131. For example, the wireless receiving circuit 131 may include a receiving coil or a receiving antenna, and a rectifying circuit and/or a filtering circuit or other shaping circuits connected to the receiving coil or the receiving antenna. The wireless receiving circuit 131 converts the electromagnetic signal (or electromagnetic wave) emitted by the wireless transmitting circuit 121 into alternating current through a receiving coil or a receiving antenna, and rectifies and/or filters the alternating current through a shaping circuit, thereby converting the alternating current into a stable direct current to charge the battery 133.

It should be noted that the embodiment of the present disclosure does not specifically limit the specific form of the shaping circuit and the form of output voltage and output current of the wireless receiving circuit 131 obtained after the shaping circuit is shaped.

In addition, in some embodiments, the device to be charged 13 may further include a first voltage conversion circuit 132. The first voltage conversion circuit 132 is set on the first charging channel 134 (for example, a wire), and is set between the wireless receiving circuit 131 and the battery 133. When the output voltage of the wireless receiving circuit 131 cannot meet the expected charging voltage requirement of the battery 133, and/or the output current of the wireless receiving circuit 131 cannot meet the expected charging current requirement of the battery 133, the conversion can be performed first by the first voltage conversion circuit to obtain the expected charging voltage and/or charging current of the battery 133. For example, the output voltage and output current of the wireless receiving circuit 131 are input into the first voltage conversion circuit 132 through the first charging channel 134; after the first voltage conversion circuit 132 converts the input voltage, the output voltage and current are applied to both ends of the battery 133 through the first charging channel 134 to meet the expected charging voltage and/or charging current requirements of the battery 133.

The battery 133 may include a single cell or multiple cells. When the battery 133 includes multiple cells, the multiple cells may be connected in series. As a result, the charging voltage that the battery 133 can withstand is the sum of the charging voltages that the multiple cells can withstand, which can increase the charging speed and reduce charging heat.

For example, taking a mobile phone as an example of the device to be charged 13, when the battery 133 of the device to be charged 13 includes a single cell, the voltage of the internal single cell is generally between 3.0V and 4.35V. When the battery 133 of the device to be charged 13 includes two battery cells connected in series, the total voltage of the two battery cells connected in series is 6.0V-8.7V. Therefore, compared with a single cell, when multiple cells are connected in series, the output voltage of the wireless receiving circuit 131 can be increased. Compared with a single-cell battery, the charging current required by a multi-cell battery is about 1/N of the charging current required by a single-cell battery (N is the number of batteries which is series-connected in the device 13 to be charged) when the same charging speed is achieved. In other words, under the premise of ensuring the same charging speed (same charging power), the solution of multiple battery cells can reduce charging current, thereby reducing the heat generated by the device 13 to be charged during the charging process. On the other hand, compared with the single-cell solution, the multi-cell series solution can increase the charging voltage, thereby increasing the charging speed under the condition that the charging current remains the same.

The second control module 135 may be implemented by, for example, an independent MCU, or may also be implemented by an application processor (AP) inside the device 13 to be charged. The second control module 135 is used to communicate with the first control module 122 in the wireless charging device 12, and feedback detected information such as voltage value and/or current value on the first charging channel 134, remaining power or preset full time of battery 133 to the wireless charging device 12, and feedback error information and transmission termination information to the first control module 122. In addition, the feedback information can also include a voltage and/or current adjustment command determined by the device to be charged 13 based on detected information such as voltage value and/or current value on the first charging channel 134, remaining power, or preset full time.

The detect circuit 136 is used to detect the voltage value and/or current value on the first charging channel 134. In some embodiments, when the first voltage conversion circuit 132 is provided in the device 13 to be charged, the voltage value and/or current value on the first charging channel 134 may refer to the voltage between the first voltage conversion circuit 132 and the battery 133, that is, the output voltage and/or output current of the first voltage conversion circuit 132. the output voltage and/or output current are directly applied to the battery 133 to charge for the battery 133. Or, the voltage value and/or current value on the first charging channel 134 may also refer to the voltage value and/or current value between the wireless receiving circuit 131 and the first voltage conversion circuit 132, that is, the output voltage value and/or current value of the wireless receiving circuit 131.

In some embodiments, the detect circuit 136 may include a voltage detect circuit and a current detect circuit.

The voltage detect circuit is used to sample the voltage on the first charging channel 134 and transmit the sampled voltage value to the second control module 135. The voltage detect circuit may, for example, sample the voltage on the first charging channel 134 in a series voltage division manner.

The current detect circuit is used to sample the current on the first charging channel 134 and transmit the sampled current value to the second control module 135. The current detect circuit may, for example, sample the current on the first charging channel 134 through a current-sense resistor and a galvanometer.

After the first control module 122 receives the information fed back from the device to be charged 13 through the second control module 135, the transmitting power of the wireless transmitting circuit 121 can be adjusted according to the voltage value and/or current value on the first charging channel 134, or according to the aforementioned voltage and/or current adjustment command, such that the voltage and/or current of the direct current output by the first charging channel 134 matches the charging voltage and/or current required by the battery 133.

It should be understood that the above "matching the charging voltage and/or current required by the battery 133" includes the voltage and/or current of the direct current output by the first charging channel 134 is equal to the expected charging voltage and/or current of the battery 133, or the voltage and/or current of the direct current output by the first charging channel 134 floats within a preset range (for example, the voltage value fluctuates between 100 mV and 200 mV).

Alternatively, after the first control module 122 receives the information fed back from the device to be charged 13 through the second control module 135, the transmission power of the wireless transmitting circuit 121 can be adjusted based on the voltage value and/or current value on the first charging channel 134, or based on the aforementioned voltage and/or current adjustment command, so that the voltage and/or current of the direct current output by the first charging channel 134 matches the requirements of the battery 133 in at least one charging stage of the trickle charging stage, constant current charging stage, and constant voltage charging stage.

In addition, as described above, the second control module 135 may also send battery status information to the first control module 122. The battery status information includes the current power and/or current voltage of the battery 133 in the device 13 to be charged. After the first control module 122 receives the battery status information, the current charging stage of the battery 133 can be determined according to the battery status information first, and then the target output voltage value and/or the target output current value matching the current charging stage of the battery 133 is determined. Then, the first control module 122 may compare the output voltage and/or output current of the first charging channel 134 sent by the second control module 135 with the determined, and related to the current charging stage of the battery 133, target output voltage value and/or the target charging current, to determine whether the output voltage and/or output current of the first charging channel 134 matches the determined charging stage of the battery 133 currently. If it does not match, the transmission power of the wireless transmitting circuit 121 is adjusted until the output voltage and/or output current of the first charging channel 134 fed back match the current charging stage of the battery 133.

In addition, as described above, the second control module 135 can directly feedback the detected output voltage and/or output current of the first charging channel 134 to the first control module 122, and can also feedback an adjustment command determined according to the detected output voltage and/or output current of the first charging channel 134. The adjustment command may be a command to increase or decrease the transmission power of the wireless transmitting circuit 121, for example. Alternatively, the wireless charging device 12 may also set multiple transmission power levels for the wireless transmitting circuit 121, and the first control module 122 adjusts the transmission power of the wireless transmitting circuit 121 by one level each time the adjustment instruction is received, until the feedback output voltage and/or output current of the first charging channel 134 match the current charging stage of the battery 133.

The present disclosure does not limit the communication mode and communication sequence between the wireless charging device 12 and the device to be charged 13 (or the first control module 122 and the second control module 135).

In some embodiments, the wireless communication between the wireless charging device 12 and the device to be charged 13 (or the first control module 122 and the second control module 135) may be one-way wireless communication. Take it as an example that the device to be charged 13 is the initiator of communication, and the wireless charging device 12 is the receiver of the communication in the wireless charging process of the battery 133. For example, in the constant current charging stage of the battery, the device to be charged 13 can implement detection of the charging current of the battery 133 through the detect circuit 136 (that is, the output current of the first charging channel 134). When the charging current of the battery 133 does not match the current charging stage, the device to be charged 13 sends feedback information or adjustment information to the wireless charging device 12 to instruct the wireless charging device 12 to adjust the transmitting power of the wireless transmitting circuit 121.

In some embodiments, the wireless communication between the wireless charging device 12 and the device to be charged 13 (or the first control module 122 and the second control module 135) may be two-way wireless communication. Two-way wireless communication generally requires the receiver to send response information to the initiator after receiving the communication request initiated by the initiator. The two-way communication can make the communication process more secure. In the two-way wireless communication process, any one of the wireless charging device 12 and the device to be charged 13 can act as the master device to initiate a two-way communication session, and the other one can act as a slave device to give a first response or a first reply to the communication initiated by the master device, and further, the master device will make a targeted second response after receiving the first response or the first reply, thereby reply communication negotiation process between the master and the slave device is completed.

The targeted second response made by the master device after receiving the first response or the first reply includes that the master device does not receive the first response or the first reply from the slave device for the communication session within the preset time, the master device will also make a targeted second response to the first response or the first reply of the slave device.

In addition, after the slave device makes the first response or the first reply for the communication session initiated by the master device side, there is no need for the master device to make a targeted second response to the first response or the first reply from the slave device. That is, reply communication negotiation process between the master and the slave device is completed.

During the communication process between the wireless charging device 12 and the device to be charged 13, the second control module 135 in the device to be charged 13 can couple the feedback information to the receiving coil of the wireless receiving circuit 131 and send it to the first control module 122 in the wireless charging device 12.

Alternatively, the device 13 to be charged can also communicate with the wireless charging device 12 via at least one of communication modes such as Bluetooth, WiFi, mobile cellular network (such as 2G, 3G, 4G or 5G), wireless communication (such as IEEE 802.11, 802.15 (WPANs), 802.16 (WiMAX), 802.20, etc.), based on at least one of high-frequency antenna (such as 60 GHz) short-range wireless communication, optical communication (such as infrared communication), ultrasonic communication, ultra-wideband (UMB) communication, to send the above feedback information to the wireless charging device 12. It is understandable that when communicating through the above-mentioned communication method, the device to be charged 13 and the wireless charging device 12 also include corresponding communication modules, such as at least one of a Bluetooth communication module, a WiFi communication module, a 2G/3G/4G/5G mobile communication module, a high frequency antenna, an optical communication module, an ultrasonic communication module, an ultra-wideband communication module, etc. It should be understood that the aforementioned standards applicable to wireless communication include previous and existing standards, and also include future versions and future standards that adopt these standards without departing from the scope of the present disclosure. By communicating through the above-mentioned wireless communication mode, the reliability of communication can be improved, thereby improving charging safety. Compared with the communication method that the feedback information is coupled to the receiving coil of the wireless receiving circuit 131 through signal modulation in the related technology (for example, the Qi standard), the reliability of communication can be improved, and voltage ripple caused by using signal coupling communication bands can be avoided, which affects the voltage processing process of the first voltage conversion circuit 132 of the device 13 to be charged. In addition, for the voltage ripple when the wireless receiving coil is output, if the ripple is not effectively processed, it may cause wireless charging safety problems, and there are certain safety risks. Communication through the above-mentioned wireless communication method can eliminate voltage ripple, thereby eliminate the need for a circuit for processing voltage ripple, reduce the complexity of the charging circuit of the device 13 to be charged, improve charging efficiency, and save circuit installation space, cut costs.

The power supply device 11 may be a power supply device with a fixed output power, or a power supply device with an adjustable output power. The power supply device with adjustable output power can be provided with a voltage feedback loop and a current feedback loop, so that its output voltage and/or output current can be adjusted according to actual needs.

As described above, the wireless charging device 12 can continuously adjust the transmitting power of the wireless transmitting circuit 121 during the charging process, so that the output voltage and/or output current of the first charging channel 134 match the current charging stage of the battery 133.

In some embodiments, the first control module 122 can adjust the amount of power extracted by the wireless transmitting circuit 121 from the maximum output power provided by the power supply device 11, thereby adjusting the transmitting power of the wireless transmitting circuit 121. In other words, the control right to adjust the transmission power of the wireless transmitting circuit 121 is allocated to the first control module 122, and the first control module 122 can adjust the transmitting power of the wireless transmitting circuit 121 through adjusting the output power extracted from the maximum output power after receiving the feedback information of the device 13 to be charged, which has the advantages of fast adjustment speed and high efficiency.

For example, a power adjustment circuit may be provided inside the first control module 122, inside the wireless transmitting circuit 121, or between the first control module 122 and the wireless transmitting circuit 121. The power adjustment circuit may include, for example, a pulse width modulation (PWM) controller and a switch unit. The first control module 122 may adjust the transmission power of the wireless transmitting circuit 121 by adjusting the duty cycle of the control signal sent by the PWM controller, and/or by controlling the switching frequency of the switch unit.

Alternatively, in other embodiments, the first control module 122 may adjust the output voltage and/or output current of the power supply device 11 by communicating with the power supply device 11, to adjust the transmission power of the wireless transmitting circuit 121. That is to say, the control right for adjusting the transmission power of the wireless transmitting circuit 121 is allocated to the power supply device 11, and the power supply device 11 adjusts the transmission power of the wireless transmitting circuit 121 by changing the output voltage and/or output current. The advantage of this adjustment method is that as much power is required by the wireless charging device 12, the power supply device 11 provides as much power, and there is no waste of power.

It should be understood that, similar to the communication method between the wireless charging device 12 and the device to be charged 13, the communication between the wireless charging device 12 (or the first control module 122) and the power supply device 11 may be one-way communication, or it may be two-way communication, which is not specifically limited in the present disclosure.

Figure 2:
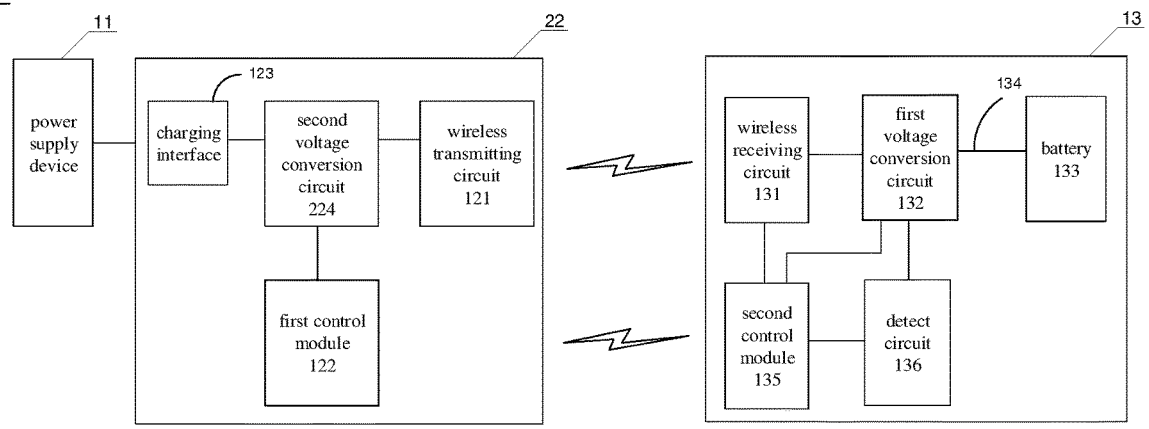
FIG. 2 is a system structure diagram of another wireless charging system according to an exemplary embodiment.

FIG. 2 is a system structure diagram of another wireless charging system according to an exemplary embodiment.

Referring to FIG. 2, the difference from the wireless charging system 1 shown in FIG. 1 is that the wireless charging device 22 in the wireless charging system 2 further includes a second voltage conversion circuit 224. The second voltage conversion circuit 224 is provided between the charging interface 123 and the wireless transmitting circuit 121, and the second voltage conversion circuit 224 can be used to receive the output voltage and output current of the power supply device 11, the wireless transmitting circuit 121 is used to generate electromagnetic signals (or electromagnetic waves) based on the voltage and current which are converted by the second voltage conversion circuit 224.

Adjusting the transmission power of the wireless transmitting circuit 121 by the first control module 122 may include the first control module 122 adjusts the voltage and/or current converted by the second voltage conversion circuit 224, to adjust the transmission power of the wireless transmitting circuit 121.

When the power supply device 11 is a power supply device with a fixed output power, the first control module can adjust the output voltage and/or output current of the second voltage conversion circuit 224, thereby adjusting the transmission power of the wireless transmitting circuit 121. The versatility of the wireless charging device 22 is improved to be applicable to the existing ordinary power supply device 11. The second voltage conversion circuit 224 may include, for example, a PWM controller and a switch unit. The first control module may adjust the output voltage and/or output current of the circuit 224 through adjusting the duty cycle of the control signal sent by the PWM controller and/or through controlling the switching frequency of the switch unit, thereby adjusting the transmission power of the wireless transmitting circuit 121.

Optionally, in some embodiments, the second voltage conversion circuit 224 may receive the output voltage and output current of the power supply device 11 through the charging interface 123. For example, when the power supply device 11 is a common power supply device, the wireless charging device 22 is connected to the common power supply device through the charging interface 123, and during wireless charging, the first control module 122 can control the second voltage conversion circuit 224 to start working, and adjust the output voltage and/or output current of the second voltage conversion circuit 224 according to the feedback information of the device 13 to be charged, so that the transmission power of the wireless transmitting circuit 121 matches the current charging requirement of the battery 133. The adjustment method also allocates the control right for adjusting the transmission power of the wireless transmitting circuit 121 to the first control module 122. The first control module 122 can immediately control the transmission power of the wireless transmitting circuit 121 after receiving the feedback information of the device 13 to be charged. The adjustment method has the advantages of fast adjustment speed and high efficiency.

It should also be understood that the output current of the power supply device 11 may be constant direct current, pulsating direct current or alternating current, which is not specifically limited in the present disclosure.

The above description is based on the example in which the wireless charging device 12 or 22 is connected to the power supply device 11, and the power is obtained from the power supply device 11. However, the present disclosure is not limited to this. The wireless charging device 12 or 22 can also be integrated inside the function as an adapter, so that it can directly convert the externally input AC current (such as mains) into the above-mentioned electromagnetic signal (or electromagnetic wave). For example, the function of the adapter may be integrated in the wireless transmitting circuit 121 of the wireless charging device 12 or 22. For example, a rectifier circuit, a primary filter circuit, and/or a transformer may be integrated in the wireless transmitting circuit 121. In this way, the wireless transmitting circuit 121 can be used to receive externally input AC current (such as 220V AC current, or city power), and generate electromagnetic signals (or electromagnetic waves) based on the AC current. The wireless charging device 12 or 22 integrates inside a function similar to an adapter, so that the wireless charging device 12 or 22 does not need to obtain power from an external power supply device, which improves the integration of the wireless charging device 12 or 22 and reduces the number of devices required for the realization of wireless charging process.

In addition, the above-mentioned power supply device 11 includes a fast-charging type power supply device and a normal-charging type power supply device. The maximum output power provided by the fast-charging type power supply device is greater than or equal to the preset value. The maximum output power provided by the normal-charging type power supply device is less than the preset value. It should be understood that, in the embodiments of the present disclosure, the fast-charging type power supply device and the normal-charging type power supply device are only classified by the maximum output power, and other characteristics of the power supply device are not distinguished here. That is to say, the fast-charging type and the normal-charging type can be equivalent to the first-charging type and the second-charging type, respectively. For example, a power supply device with a maximum output power greater than or equal to 20 W may be classified as a fast-charging type power supply device, and a power supply device with a maximum output power less than 20 W may be classified as a normal-charging type power supply device.

Correspondingly, the wireless charging device 12 or 22 can support the first wireless charging mode and the second wireless charging mode, and the charging speed of the wireless charging device 12 or 22 charging to the device to be charged 13 in the first wireless charging mode is greater than the charging speed of the wireless charging device 12 or 22 charging to the device to be charged 13 in the second wireless charging mode. In other words, compared to the wireless charging device 12 or 22 working in the second wireless charging mode, the wireless charging device 12 or 22 working in the first wireless charging mode takes a shorter time to charge the battery with the same capacity of the equipment to be charged 13.

The first wireless charging mode may be a fast wireless charging mode. The fast wireless charging mode may refer to a wireless charging mode in which the wireless charging device 12 or 22 has a large transmission power (usually greater than or equal to 15 W).

The second wireless charging mode may be a normal wireless charging mode, which may refer to a wireless charging method in which the wireless charging device 12 or 22 has a small transmission power (usually less than 15 W, and the commonly used transmission power is 5 W or 10 W), for example, it can be a traditional wireless charging mode based on QI standard, PMA standard or A4WP standard.

In the normal wireless charging mode, it usually takes several hours to fully charge a large capacity battery (such as a 3000 mAh battery); while in the fast wireless charging mode, the charging speed is faster, and the charging time required to completely fully charge a battery of the same capacity can be significantly shortened.

In some embodiments, the first control module 122 and the second control module 135 perform two-way communication to control the transmission power of the wireless transmitting circuit 121 in the first wireless charging mode.

In some embodiments, the first control module 122 and the second control module 135 may perform two-way communication to control the transmission power of the wireless transmitting circuit 121 in the first wireless charging mode. The process may include the first control module 122 and the second control module 135 performs two-way communication to negotiate a wireless charging mode between the wireless charging device 12 or 22 and the device 13 to be charged.

For example, the first control module 122 conducts handshake communication with the second control module 135. If the handshake communication is successful, the wireless charging device 12 or 22 is controlled to use the first wireless charging mode to charge the device 13 to be charged, and if the handshake communication fails, the wireless charging device 12 or 22 is controlled to use the second wireless charging mode to charge the device 13 to be charged.

Handshake communication can refer to the identification of the identities of the two communicating parties. The successful handshake communication may indicate that the wireless charging device 12 or 22 and the device to be charged 13 both support a wireless charging method with adjustable transmission power. The failure of the handshake communication may indicate that at least one of the wireless charging device 12 or 22, and the device to be charged 13 does not support a wireless charging method with adjustable transmission power.

In the present disclosure, the wireless charging device 12 or 22 does not blindly use the first wireless charging mode for fast wireless charging of the device 13 to be charged, but performs two-way communication with the device 13 to be charged to negotiate whether the first wireless charging mode can be used to fast wireless charging to the device 13 to be charged, which can improve the safety of the charging process.

In some embodiments, the first control module 122 and the second control module 135 perform two-way communication to negotiate the wireless charging mode between the wireless charging device 12 or 22 and the device 13 to be charged, for example, includes the second control module 135 sends a first command, and the first command is used to inquire whether the device to be charged 13 turns on the first wireless charging mode; the first control module 122 receives a reply command to the first command sent by the second control module 135, the reply command is used to indicate whether the device to be charged 13 agrees to turn on the first wireless charging mode; when the device to be charged 13 agrees to turn on the first wireless charging mode, the first control module controls the wireless charging device 12 or 22 to use the first wireless charging mode to charge the device 13 to be charged.

In addition to determining the wireless charging mode based on communication negotiation, the first control module 122 can also select or switch the wireless charging mode according to some other factors. For example, the first control module 122 can also control the wireless charging device 12 or 22 to use the first wireless charging mode or the second wireless charging mode to charge the battery 133 according to the temperature of the battery 133. For example, when the temperature is lower than a preset low temperature threshold (such as 5° C. or 10° C.), the first control module 122 may control the wireless charging device 12 or 22 to use the second wireless charging mode for normal charging, and when the temperature is greater than or equal to preset low temperature threshold, the first control module 122 may control the wireless charging device 12 or 22 to use the first wireless charging mode for fast charging. Further, when the temperature is higher than a high temperature threshold (for example, 50° C.), the first control module 122 may control the wireless charging device 12 or 22 to stop charging.

Before introducing the wired charging system, first explain the "normal-charging type" and "fast-charging type" in the wired charging system. The normal-charging type means that the adapter outputs a relatively small current value (usually less than 2.5 A) or uses a relatively small power (usually less than 15 W) to charge the battery in the device to be charged. It usually takes several hours to fully charge a larger capacity battery (such as a 3000 mAh battery) in the normal-charging type. Fast-charging type means that the adapter can output a relatively large current (usually greater than 2.5 A, such as 4.5 A, 5 A or even higher) or relatively large power (usually greater than or equal to 15 W) to charge the battery in the device to be charged. Compared with the normal-charging mode, the charging speed of the adapter in the fast-charging mode is faster, and the charging time required to fully charge the battery of the same capacity can be significantly shortened.

In the wired charging process, a power supply device (such as an adapter) is generally connected to the device to be charged through a cable, and the power provided by the power supply device is transmitted to the device to be charged through the cable to charge the device to be charged.

Figure 3:
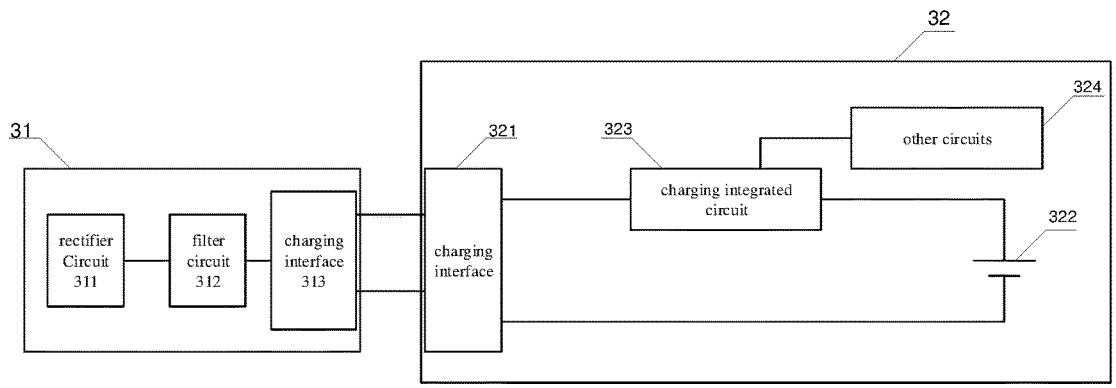
FIG. 3 is a system structure diagram of a wired charging system according to an exemplary embodiment.

FIG. 3 is a system structure diagram of a wired charging system according to an exemplary embodiment.

Referring to FIG. 3, the wired charging system 3 includes a power supply device 31 and a device to be charged 32, wherein, the power supply device 31 may be, for example, a power adapter, a power bank, etc.; the device to be charged 32 may be, for example, a terminal device.

The device to be charged 32 can be charged by a 10 W (5V/2A) power supply device 31, that is, the power supply device 31 uses the above-mentioned normal-charging type to charge the device to be charged 32.

The power supply device 31 includes a rectifier circuit 311, a filter circuit 312, and a charging interface 313.

The rectifier circuit 311 is used to convert the input AC current into DC current, and the filter circuit 312 is used to filter the DC current output by the rectifier circuit 311 to provide stable DC current to the device to be charged 32 connected to the charging interface 313.

The device to be charged 32 includes a charging interface 321, a battery unit 322, a charging integrated circuit (IC) 323, and other circuits 324.

The device to be charged 32 receives the electric energy provided by the power supply device 31 through the charging interface 321. The charging interface 321 may be, for example, a USB 2.0 interface, a Micro USB interface, or a USB TYPE-C interface. In some embodiments, the charging interface 321 may also be a lightning interface, or any other type of parallel port or serial port that can be used for charging. The battery unit 322 contains, for example, a single lithium battery unit. The charge cut-off voltage of a single cell is generally 4.2V. Therefore, a charging integrated circuit 323 needs to be configured to convert the 5V voltage into the expected charging voltage of the battery unit 322.

In addition, the charging integrated circuit 323 can also be used as a conversion circuit to control the charging voltage and/or charging current of the battery unit 322 in the above-mentioned different charging stages. For example, in the constant current charging stage, the conversion circuit can use a current feedback loop to make the current entering the battery meet the expected first charging current of the battery. In the constant voltage charging stage, the conversion circuit can use a voltage feedback loop to make the voltage applied to the two ends of the battery unit 322 meet the expected charging voltage of the battery. In the trickle charging stage, the conversion circuit can use the current feedback loop to make the current entering the battery meet the second charging current expected by the battery (the second charging current is less than the first charging current).

The charging integrated circuit 323 can also obtain battery capacity information of the battery unit 322 to adjust the charging voltage and/or charging current loaded on both ends of the battery unit 322 according to the battery capacity information of the battery unit 322. For example, the charging integrated circuit 323 may measure the charging voltage and/or charging current through a fuel gauge.

Figure 4:
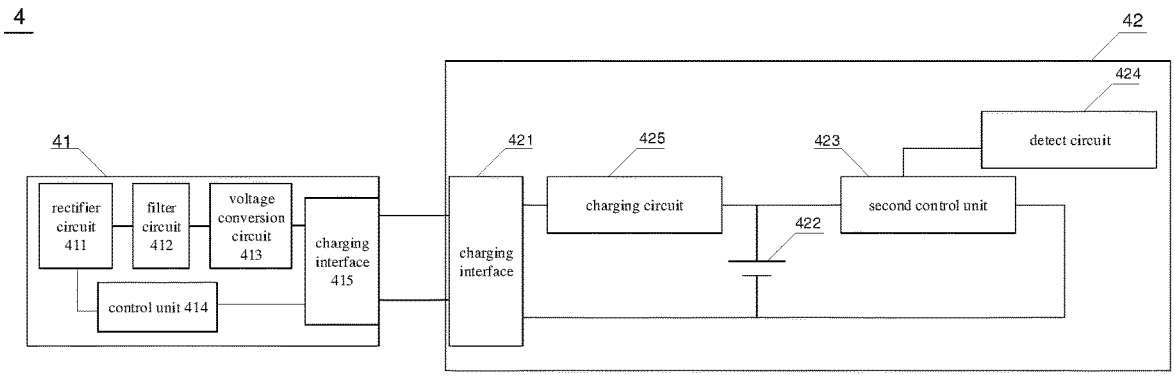
FIG. 4 is a system structure diagram of another wired charging system according to an exemplary embodiment.

FIG. 4 is a system structure diagram of another wired charging system according to an exemplary embodiment.

Referring to FIG. 4, the wired charging system 4 includes a power supply device 41 and a device to be charged 42. Wherein, the power supply device 41 may be, for example, a power adapter, a power bank, etc.; the device to be charged 42 may be, for example, a terminal device.

The device to be charged 42 can be quickly charged by a 20 W (5V/4A) high-power power supply device 41. That is, the power supply device 41 uses the aforementioned fast-charging type to charge the device to be charged 42.

The power supply device 41 includes a rectifier circuit 411, a filter circuit 412, a voltage conversion circuit 413, a first control unit 414, and a charging interface 415.

Wherein, the rectifier circuit 411 is used to convert the input AC current into DC current; the filter circuit 412 is used to filter the DC current output by the rectifier circuit 411 to provide stable DC current; the voltage conversion circuit 413 is used to perform voltage conversion on the DC current output from the filter circuit 412, the voltage conversion circuit 413 is usually a step-down circuit configured to provide a suitable voltage direct current to the device to be charged 42 through the charging interface 415; the first control unit 414 is used to receive feedback from the device 42 to control the voltage and/or current of the direct current output by the rectifier circuit 411. In addition, the first control unit 414 is also used to control the charging voltage and/or charging current of the battery unit 422 in the device to be charged 42 in the above-mentioned different charging stages (e.g., constant current charging stage, constant voltage charging stage, etc.).

In some embodiments, the power supply device 41 can also provide pulsating DC current to charge the device to be charged 42. The power supply device 41 outputs pulsating DC current. For example, the aforementioned filter circuit 412 can be removed, so that the unfiltered current output by the rectifier circuit 411 can be used to directly charge the device to be charged 42 through the voltage conversion circuit 413 and the charging interface 415. Alternatively, the electrolytic capacitor included in the aforementioned filter circuit 412 can also be removed to realize the output of pulsating direct current.

The device to be charged 42 includes a charging interface 421, a battery unit 422, a second control unit 423, a detect circuit 424, and a charging circuit 425.

The charging circuit 425 is connected to the charging interface 421 and the battery unit 422, the charging circuit 425 is used to charge the battery unit 422. The charging interface 421 may be, for example, a USB 2.0 interface, a Micro USB interface, or a USB TYPE-C interface. In some embodiments, the charging interface 421 may also be a lightning interface, or any other type of parallel port or serial port that can be used for charging.

Takes the battery unit 422 includes a lithium battery containing a single lithium battery cell as an example. Because there is a voltage conversion circuit 413 in the power supply device 41, the voltage output by the power supply device 41 can be directly applied to both ends of the battery unit 422, so that the charging circuit 425 uses a direct charging way to charge the battery unit 422. The electrical energy output by the power supply device 41 is directly supplied to the battery unit 422 for charging the battery without voltage conversion after transmission through the charging circuit 425. Alternatively, the charging circuit 425 may be a switch circuit. After the current output by the power supply device 41 transmits through the charging circuit 425, the voltage drop changes little, so that it will not substantially affect the charging process of the battery unit 422.

The detect circuit 424 is used to detect the voltage value and/or current value between the charging circuit 425 and the battery unit 422, that is, the output voltage and/or output current of the charging circuit 425. The output voltage and/or output current are directly applied to the battery unit 422 to charge the battery unit 422. In addition, the detect circuit 424 may also include a fuel gauge for detecting the capacity of the battery unit 422.

The second control unit 423 communicates with the power supply device 41 to transmit the voltage value and/or current value applied to the battery unit 422 detected by the detect circuit 424 and the battery capacity information of the battery unit 422 to the power supply device 41. The second control unit 423 may communicate with the power supply device 41, for example, through the charging interface 421 without setting an additional communication interface or other wireless communication module. If the charging interface 421 is a USB interface, the second control unit 423 and the power supply device 41 may communicate based on the data line (such as D+ and/or D− line) in the USB interface. In another example, the charging interface 421 is a USB interface (such as a USB TYPE-C interface) supporting a power transmission (PD) communication protocol, and the second control unit 423 and the power supply device 41 may communicate based on the PD communication protocol. In addition, the second control unit 423 may also be communicatively connected with the power supply device 41 through other communication methods than the charging interface 421. For example, the second control unit 423 may communicate with the power supply device 11 in a wireless manner, such as near field communication.

For a device to be charged that contains a single battery cell, when a larger charging current is used to charge the single battery cell, the heating phenomenon of the device to be charged is more serious. In order to ensure the charging speed of the device to be charged and to alleviate the heating phenomenon of the device to be charged during the charging process, the battery structure can be modified to use multiple battery cells connected in series and directly charge the multiple battery cells, that is the voltage output by the adapter is directly applied to both ends of the battery unit containing multiple cells. Compared with the single-cell solution (that is, the capacity of the single-cell before the improvement is the same as the total capacity of the multiple-cell series after the improvement), the charging current required by the multiple-cell is about 1/N of the charging current required by a single cell (N is the number of cells connected in series) when the same charging speed is to be achieved. In other words, under the premise of ensuring the same charging speed, series connection of multiple cells can greatly reduce the size of the charging current, thereby further reducing the heat generated by the device to be charged during the charging process.

Figure 5:
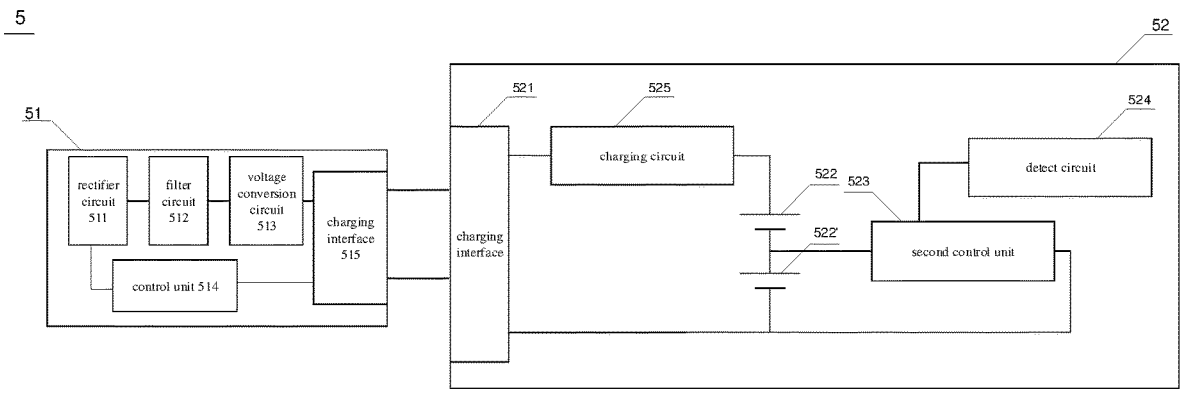
FIG. 5 is a system structure diagram of another wired charging system according to an exemplary embodiment.

FIG. 5 is a system structure diagram showing still another wired charging system according to an exemplary embodiment.

Referring to FIG. 5, the wired charging system 5 includes a power supply device 51 and a device to be charged 52. Wherein, the power supply device 51 may be, for example, a power adapter, a mobile power bank, etc.; the device to be charged 52 may be, for example, a terminal device.

The device to be charged 52 can be quickly charged by a 50 W (10V/5A) high-power power supply device 51. That is, the power supply device 51 uses the aforementioned fast-charging type to charge the device to be charged 52.

The power supply device 51 includes a rectifier circuit 511, a filter circuit 512, a voltage conversion circuit 513, a first control unit 514, and a charging interface 515.

Wherein, the rectifier circuit 511 is used to convert the input AC current into DC current; the filter circuit 512 is used to filter the DC current output by the rectifier circuit 511 to provide stable DC current; the voltage conversion circuit 513 is used to perform voltage conversion on the DC current output from the filter circuit 512 to provide DC current of a suitable voltage to the device to be charged 52 connected to the voltage conversion circuit 513 through the charging interface 515; the first control unit 514 is used to receive feedback from the device to be charged 52 to control the voltage and/or current of the DC current output by the rectifier circuit 511. In addition, the first control unit 514 is also used to control the charging voltage and/or the charging current of the first battery unit 522 and the second battery unit 522' of the device to be charged 52 during the above-mentioned different charging stages (such as constant current charging stage, constant voltage charging stage, etc.).

In some embodiments, the power supply device 51 can also provide pulsating DC current to charge the device to be charged 52. The power supply device 51 outputs pulsating DC current, for example, the aforementioned filter circuit 512 can be removed, so that the unfiltered current output by the rectifier circuit 511 is transmitted through the voltage conversion circuit 513 and the charging interface 515, and then directly supplied to the device to be charged 52. Alternatively, the electrolytic capacitor included in the aforementioned filter circuit 512 can also be removed to realize the output of pulsating direct current.

The device to be charged 52 includes a charging interface 521, a first battery unit 522, a second battery unit 522', a second control unit 523, a detect circuit 524, and a charging circuit 525.

Wherein, the charging interface 521 may be, for example, a USB 2.0 interface, a Micro USB interface, or a USB TYPE-C interface. In some embodiments, the charging interface 521 may also be a lightning interface, or any other type of parallel port or serial port that can be used for charging.

The first battery unit 522 and the second battery unit 522' are connected in series. The first battery unit 522 and the second battery unit 522' are, for example, lithium batteries including a single battery cell. The charging circuit 525 is connected to the charging interface 521 and the first battery unit 522 and the second battery unit 522' connected in series, and is configured to charge the first battery unit 522 and the second battery unit 522'. The voltage output by the power supply device 51 can be directly applied to both ends of the first battery unit 522 and the second battery unit 522' connected in series. That is, the charging circuit 35 adopts a direct-charging mode for charging the first battery unit 522 and the second battery unit 522 in series. It should be noted that, because the charging circuit 525 uses a direct-charging mode to charge the first battery unit 522 and the second battery unit 522' in series, and the line impedance will cause a voltage drop in the charging line, the output voltage received by the charging circuit 525 which is output from the power supply device 51 needs to be greater than the total voltage of the multiple cells contained in the first battery unit 522 and the second battery unit 522'. Generally speaking, the operating voltage of a single battery cell is between 3.0V-4.35V, and the output voltage of the power supply device 51 can be set to be greater than or equal to 10V when taking the double-cell series connection as an example.

It should be noted that when the device to be charged 52 is powered by the power supply device 31 or 41 in FIG. 3 or 4, since the output voltage of the power supply device 31 or 41 does not reach 10V, a boost circuit is also provided for the device to be charged 52 to boost the charging voltage applied on the first battery unit 522 and the second battery unit 522'.

The detect circuit 524 is configured to detect the voltage value and/or current value between the charging circuit 525 and the first battery unit 522 and the second battery unit 522', that is, the output voltage and/or output current of the charging circuit 525, the output voltage and/or the output current is directly applied to the first battery unit 522 and the second battery unit 522' to charge the first battery unit 522 and the second battery unit 522'. In addition, the detect circuit 524 may also include a fuel gauge for detecting the capacity of the first battery unit 522 and the second battery unit 522'.

The second control unit 523 communicates with the power supply device 51 to detect the voltage value and/or current value applied to the first battery unit 522 and the second battery unit 522' detected by the detect circuit 524, and the battery capacity information of the first battery unit 522 and the second battery unit 522' is transmitted to the power supply device 51. The second control unit 523 may communicate with the power supply device 51, for example, through the charging interface 521, without setting an additional communication interface or other wireless communication module. If the charging interface 521 is a USB interface, the second control unit 523 and the power supply device 51 can communicate based on the data lines (such as D+ and/or D− lines) in the USB interface. If the charging interface 521 is a USB interface (such as a USB TYPE-C interface) supporting a power transmission (PD) communication protocol, and the second control unit 523 and the power supply device 51 may communicate based on the PD communication protocol. In addition, the second control unit 523 may also be communicatively connected with the power supply device 51 through other communication methods than the charging interface 521. For example, the second control unit 523 may communicate with the power supply device 51 in a wireless manner, such as near field communication.

As mentioned above, the silicon anode will be a development direction to increase the energy density of lithium-ion batteries at the anode level in the future. However, because the discharge curve of the silicon negative electrode is different from that of the traditional graphite negative electrode, the lithium ion battery with the silicon negative electrode is not suitable for direct application in the existing terminal system.

The protection shutdown voltage set by the intelligent terminal system is 3.4V currently. Because generally speaking, the minimum voltage of the software set by the system platform is 3.2V, but if in high current application scenarios, the instantaneous voltage will be greatly reduced to 3.2V or even below 2.8V, which will affect the normal operation of the software.

FIG. 6 shows a comparison diagram of the discharge curves of a lithium-ion battery with a silicon anode and a lithium-ion battery with a graphite anode. As shown in FIG. 6, the capacity of the graphite anode below 3.4V is very small, which is about 5%; and the capacity of the silicon anode below 3.4V is greater than 15%. Therefore, if a lithium-ion battery with a silicon-containing negative electrode is directly used, nearly 15% of the electricity cannot be discharged, and its high energy density advantage cannot be exerted.

In order to solve the above-mentioned problems, a charging and discharging control method is provided in the present disclosure, which can increase the discharge capacity of a new type of battery (such as a silicon negative battery) as much as possible without changing the existing battery discharge circuit.

FIG. 7 is a flowchart showing a charging and discharging control method according to an exemplary embodiment. The charging and discharging control method shown in FIG. 7 can be applied to a device to be charged that includes a first battery unit and a second battery unit connected in series in each of the above systems, wherein the second battery unit supplies power to the device to be charged, and The device to be charged also needs to be provided with a balance module, which is electrically connected to the first battery unit and the second battery unit.

Referring to FIG. 7, the charging and discharging control method 10 includes the following.

In step S102, when the voltage of the second battery unit is equal to or less than the preset first voltage threshold, the balance module transfers the power in the first battery unit to the second battery unit, such that the voltage of the second battery unit is greater than the first voltage threshold.

For example, the first voltage threshold can be set to 3.4V, which is the protection shutdown voltage currently set by the smart terminal system, but the present disclosure is not limited to this, and it can be set according to actual requirements in applications.

When the voltage of the second battery unit is greater than the first voltage threshold, the power is supplied by the second battery unit normally. The second battery unit is, for example, a traditional graphite negative lithium ion battery, and in the device to be charged, it is connected to the circuit to be powered inside the device to be charged, so that the second battery unit supplies for the device to be charged. The power supply circuit is the same as the existing discharge circuit.

When the voltage of the second battery unit is greater than the first voltage threshold, the balance module electrically connected to the first battery unit and the second battery unit can start to work, and the power in the first battery unit can be transferred to the second battery unit through the balance module, so that the voltage of the second battery unit is greater than the first voltage threshold, and the device to be charged will not shut down due to the contained voltage.

The balance module can be any equalization circuit that can balance the voltages of multiple battery cells in the prior art. For example, it may be the balance module disclosed by the applicant in the Chinese patent application with application publication number CN108124498A, or it may also be the balance module disclosed by the applicant in the Chinese patent application with application publication number CN107996014A, both of which are incorporated by references in their entireties Wherein, the first battery unit may be, for example, the above-mentioned silicon negative electrode lithium ion battery with a large capacity. Therefore, this method makes full use of the large capacity advantage of the silicon negative electrode lithium ion battery without changing the existing discharge circuit. The battery capacity of the silicon negative electrode lithium-ion battery is utilized as much as possible to maximize the energy density of the battery in the device to be charged.

It should be understood by those skilled in the art that the first battery unit is a silicon anode lithium-ion battery as an example. This method can also be applied to devices to be charged with other new large-capacity batteries, so as to maximize the battery capacity in the new battery is used.

In some embodiments, the charging and discharging control method 10 may further includes, in step S104, when the voltage of the first battery unit is equal to or less than the preset second voltage threshold, the second battery unit is stopped from discharging.

Taking the first battery unit as a silicon negative lithium ion battery as an example, the second voltage threshold may be set to 2.5V, for example. The setting of the second voltage threshold is related to the battery type of the first battery unit. For example, it can be set as the cut-off voltage at which the capacity of the first battery unit is used up when the first battery unit is used alone. But to make some reservations, it can be set slightly higher than the cut-off voltage.

In some embodiments, the charging and discharging control method 10 may further include the followings.

In step S106, after the second battery unit stops discharging, the voltage of the first battery unit and the second battery unit are balanced by the balance module, such that the voltage of the first battery unit is equal to the voltage of the second battery unit.

For example, when discharging stops, the voltage of the second battery unit is approximately the first voltage threshold (such as 3.4V), and the voltage of the first battery unit is approximately the second voltage threshold (such as 2.5V), which can be balanced to a preset voltage value, such as 3.0V, which can be set according to actual application scenarios.

When the discharge stops, it can be recognized that the voltages of the two battery units are different, and the voltages of the two battery units are the same through the internal charging and discharging process.

FIG. 8 is a flowchart showing another charging and discharging control method according to an exemplary embodiment. The difference from the charging and discharging control method 10 shown in FIG. 7 is that the charging and discharging control method 20 shown in FIG. 8 further provides a charging control method for the first battery unit and the second battery unit.

Referring to FIG. 8, the charging and discharging control method 20 further includes the following.

In step S202, after the charging of the first battery unit and the second battery unit is cut off, the voltages of the first battery unit and the second battery unit are balanced by the balance module, such that the voltage of the first battery unit is equal to that of the second battery unit.

When charging the first battery unit and the second battery unit, if the power supply device can support the direct charging of two-unit series batteries (such as the power supply device 51 with an output voltage of 10V in FIG. 5 above), the direct charging channel can be used directly charge for the first battery unit and the second battery unit. And if the power supply device cannot support the directly charging of the two-unit series battery (such as the power supply device 31 with an output voltage of 5V in FIG. 3 above, and the power supply device 41 with an output voltage of 5V in in FIG. 4), the charging voltage applied to the first battery unit and the second battery unit can be boosted by a voltage conversion unit (such as a Boost circuit) to meet the charging voltage of the double-unit series batteries.

During the charging process, the cut-off voltage of the constant current charging stage is determined by the battery unit that first reaches the cut-off voltage, and is usually determined by factors such as battery type and voltage platform. After the charging is cut off, the voltage between the first battery unit and the second battery unit is the same through active balancing. In addition, the charging rate of the constant current charging stage is determined by the battery unit with a small charging rate. Similarly, it is usually determined by factors such as battery type and voltage platform.

Steps S102 to S106 are the same as steps S102 to S106 in the charging and discharging control method 10, and will not be repeated here.

FIG. 9 is a flow chart showing another charging and discharging control method according to an exemplary embodiment. The charging and discharging control method shown in FIG. 9 can be applied to a device to be charged that includes a first battery unit and a second battery unit connected in series in each of the above systems. In addition, the device to be charged needs to be provided with a voltage conversion circuit, and the voltage conversion circuit is electrically connected to the first battery unit, and converts the supply voltage output by the first battery unit when the first battery unit supplies power to the device to be charged, so as to meet the power supply voltage requirement of the circuit to be powered inside the device to be charged.

Referring to FIG. 9, the charging and discharging control method 30 includes the following.

In step S302, when the voltage of the second battery unit is greater than the preset first voltage threshold, the second battery unit supplies power to the device to be charged.

The first voltage threshold can be set to, for example, 3.0V, that is, the protection shutdown voltage currently set by the smart terminal system, but the present disclosure is not limited to this.

The second battery unit may be, for example, a graphite negative lithium ion battery. When its voltage is greater than the first voltage threshold, it is the same as the existing discharge circuit and supplies power to the device to be charged through the second battery unit.

In step S304, when the voltage of the second battery unit is less than the first voltage threshold, the first battery unit supplies power to the device to be charged; when the voltage of the first battery unit is equal to or less than the first voltage threshold, the supply voltage output by the first battery unit is boosted by the voltage conversion circuit, such that the supply voltage is greater than the first voltage threshold.

A discharge circuit can be designed for the first battery unit, and when the voltage of the second battery unit is less than the first voltage threshold, the first battery unit supplies power to the device to be charged.

The first battery unit may be, for example, a silicon negative electrode lithium ion battery, or may also be another new type battery with a large capacity.

When the device to be charged is powered by the first battery unit, when the voltage of the first battery unit is equal to or less than the first voltage threshold, the power supply voltage output by the first battery unit is boosted by the voltage conversion circuit to make it supply power voltage is greater than the first voltage threshold. The capacity of the large-capacity battery can be utilized as much as possible through this design, thereby maximizing the energy density of the terminal device to be charged.

In some embodiments, the charging and discharging control method 30 further includes the followings.

In step S306, when the voltage of the first battery unit is equal to or less than the preset second voltage threshold, the first battery unit is stopped from discharging.

Taking the first battery unit as a silicon negative lithium ion battery as an example, the second voltage threshold may be set to 2.5V, for example. The setting of the second voltage threshold is related to the battery type of the first battery unit. For example, it can be set as the cut-off voltage at which the capacity of the first battery unit is used up when the first battery unit is used alone. It can be set slightly higher than the cut-off voltage.

In some embodiments, the device to be charged may further include a balance module, which is electrically connected to the first battery unit and the second battery unit, and the charging and discharging control method 30 may further include the following.

In step S308, after the first battery unit stops discharging, the voltages of the first battery unit and the second battery unit are balanced by the balance module, such that the voltage of the first battery unit is equal to the voltage of the second battery unit.

For example, when the discharge stops, the voltage of the second battery unit is approximately the first voltage threshold (such as 3.4V), and the voltage of the first battery unit is approximately the second voltage threshold (such as 2.5V), which can be balanced to a preset voltage value, such as 3.0V, and the preset voltage value can be set according to actual application scenarios.

When the discharge stops, it can be recognized that the voltages of the two battery units are different, and the voltages of the two battery units are the same through the internal charging and discharging process.

According to the charging and discharging control method provided by the embodiments of the present disclosure, when two battery units connected in series are used, different discharging circuits are used to supply power to the device to be charged under different circumstances. When the voltage of the second battery unit reaches the first voltage threshold (such as the protection shutdown voltage set by the current smart terminal system), continue to use the first battery unit with a large capacity to power the device to be charged, and supply power voltage is converted through the voltage conversion circuit to maximize the use of the capacity of the first battery unit, thereby increasing the energy density of the terminal device to be charged.

Figure 10:
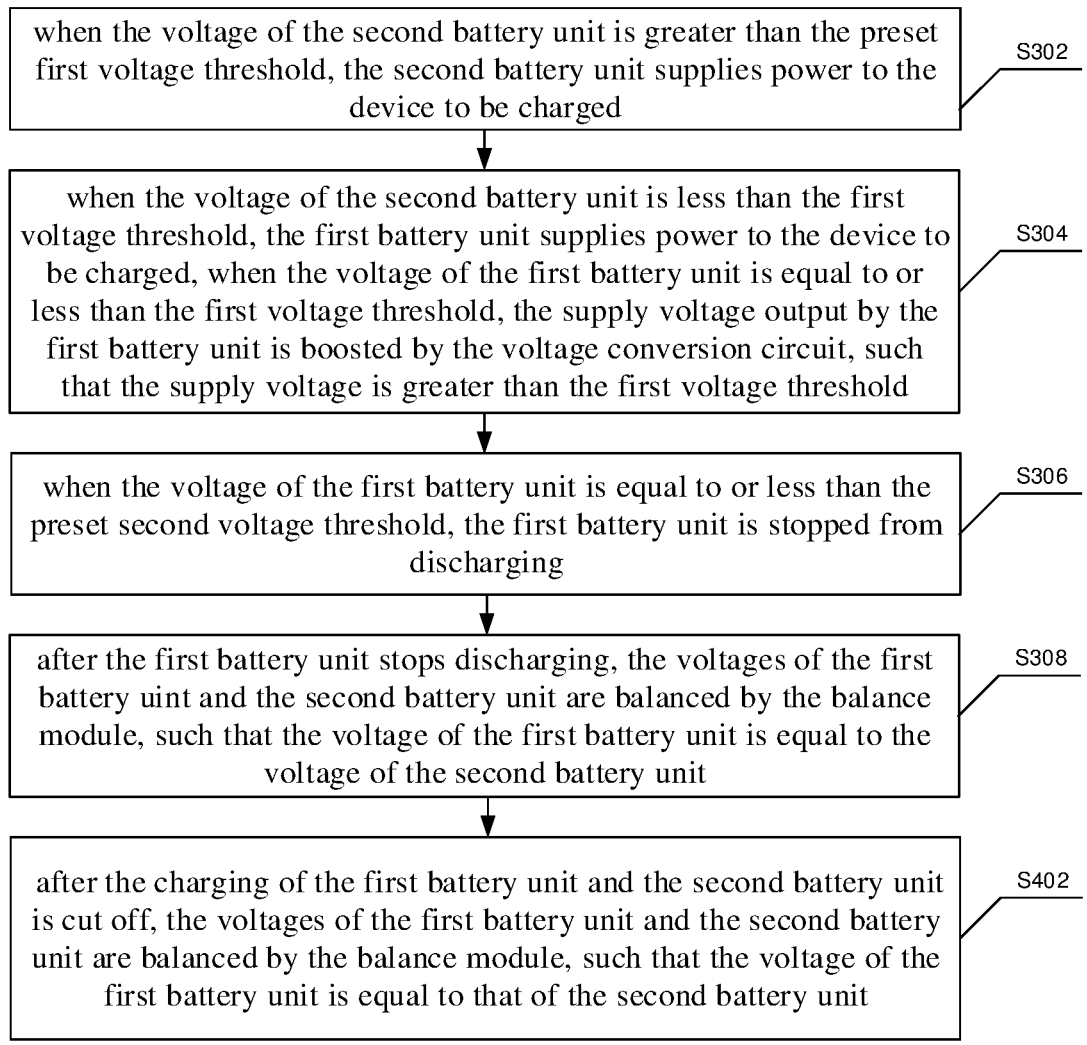
FIG. 10 is a flowchart of another method of charging and discharging control according to an exemplary embodiment.

FIG. 10 is a flow chart showing still another charging and discharging control method according to an exemplary embodiment. The difference from the charging and discharging control method 30 shown in FIG. 9 is that the charging and discharging control method 40 shown in FIG. 10 further provides a charge control method for the first battery unit and the second battery unit.

Referring to FIG. 10, the charging and discharging control method 40 further includes the following.

In step S402, after the charging of the first battery unit and the second battery unit is cut off, the voltages of the first battery unit and the second battery unit are balanced by the balance module, such that the voltage of the first battery unit is equal to that of the second battery unit.

When charging for the first battery unit and the second battery unit, if the power supply device can support the direct charging of two-unit series batteries (such as the power supply device 51 with an output voltage of 10V in FIG. 5 above), the direct charging channel can be used directly charge the first battery unit and the second battery unit; and if the power supply device cannot support the direct charging of the two-cell series battery (such as the power supply device 31 with an output voltage of 5V in FIG. 3 above and the power supply device 41 with an output voltage 5V in FIG. 4), the charging voltage applied to the first battery unit and the second battery unit can be boosted by a voltage conversion unit (such as a Boost circuit) to meet the charging voltage of the double-cell series batteries.

During the charging process, the cut-off voltage of the constant current charging stage is determined by the battery unit that first reaches the cut-off voltage, and is usually determined by factors such as battery type and voltage platform. After the charging is cut off, the voltage between the first battery unit and the second battery unit is the same through active balance. In addition, the charging rate of the constant current charging stage is determined by the battery unit with a small charging rate. Similarly, it is usually determined by factors such as battery type and voltage platform.

Steps S302 to S308 are the same as steps S302 to S308 in the charging and discharging control method 30, and will not be repeated here.

In addition, it should be noted that the above-mentioned drawings are only schematic illustrations of the processing included in the method according to the exemplary embodiment of the present disclosure, and are not intended for limitation. It is easy to understand that the processing shown in the above drawings does not indicate or limit the time sequence of these processing. In addition, it is easy to understand that these processes can be executed synchronously or asynchronously in multiple modules, for example.

The following are device embodiments of the disclosure, which can apply the method embodiments of the disclosure. For details not disclosed in the device embodiments of the present disclosure, please refer to the method embodiments of the present disclosure.

Figure 11:
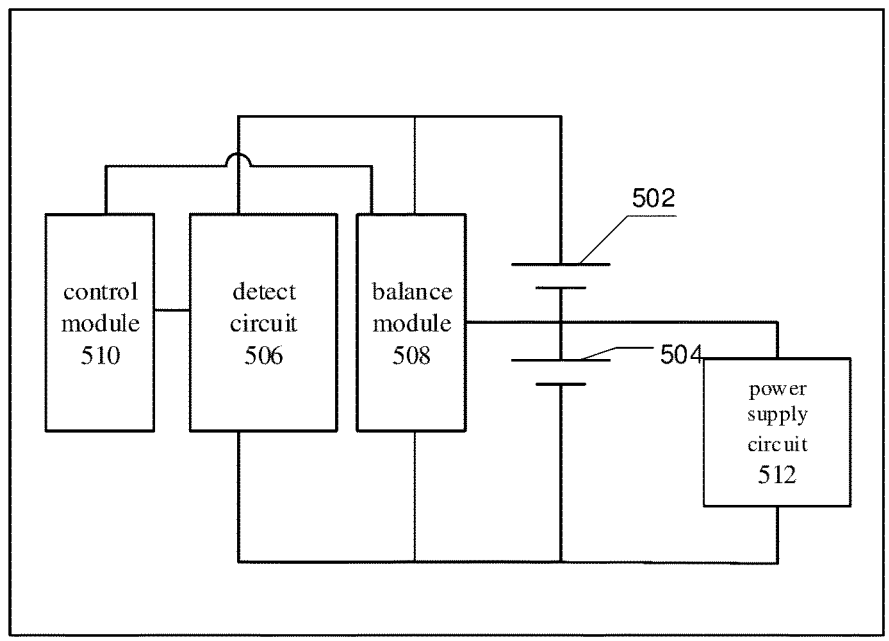
FIG. 11 is a structural diagram of a device according to an exemplary embodiment.

FIG. 11 is a schematic structural diagram of a device to be charged according to an exemplary embodiment.

Referring to FIG. 11, the device to be charged 50 includes a first battery unit 502 and a second battery unit 504 connected in series, a detect circuit 506, a balance module 508, and a control module 510.

Wherein, the second battery unit 504 is electrically connected to the power supply circuit 512 in the device 50 to be charged, and is used to supply power to the device 50 to be charged.

The detect circuit 506 is electrically connected to the first battery unit 502 and the second battery unit 504 for detecting the voltage of the first battery unit 502 and the second battery unit 504. The structure and working principle of the detect circuit 506 can refer to the detect circuits in the above-mentioned charging systems, and will not be repeated here.

The balance module 508 is electrically connected to the first battery unit 502 and the second battery unit 504 for balancing the voltage between the first battery unit and the second battery unit.

The balance module 508 may be, for example, a balance module disclosed by the applicant in the Chinese patent application with application publication number CN108124498A, or may also be a balance module disclosed by the applicant in the Chinese patent application with application publication number CN107996014A, both of which are incorporated by reference in their entireties. However, the present disclosure is not limited to this, and those skilled in the art should understand that the balance module 508 may be any balance module suitable for balancing the voltages of multiple battery units.

The control module 510 is electrically connected to the detect circuit 506 and the balance module 508, and is used to control the balance module 508 to transfer power in the first battery unit to the second battery unit when the detect circuit detects that the voltage of the second battery unit is equal to or less than the preset first voltage threshold, so that the voltage of the second battery unit is greater than the first voltage threshold.

In some embodiments, the first battery unit 502 is a silicon anode lithium ion battery.

In some embodiments, the second battery unit 504 is a graphite negative lithium ion battery.

In some embodiments, the control module 510 is further configured to control the second battery unit to stop discharging when the voltage of the first battery unit 502 is equal to or less than the preset second voltage threshold.

In some embodiments, the control module 510 is further configured to control the balance module 508 to balance the voltages of the first battery unit 502 and the second battery unit 504 after the second battery unit 504 stops discharging, so that the voltage of the first battery unit 502 is equal to the voltage of the second battery unit 504.

In some embodiments, the control module 510 is further configured to control the balance module 508 to balance the voltages of the first battery unit 502 and the second battery unit 504 after the first battery unit 502 and the second battery unit are cut off, so that the voltage of the first battery unit 502 is equal to the voltage of the second battery unit 504.

According to the device to be charged provided by the embodiments of the present disclosure, it is possible to make full use of the advantages of large capacity of the silicon negative electrode lithium ion battery without changing the existing discharge circuit, and improve the battery capacity of the silicon negative electrode lithium ion battery as much as possible, utilize to maximize the energy density of the battery in the device to be charged.

Figure 12:
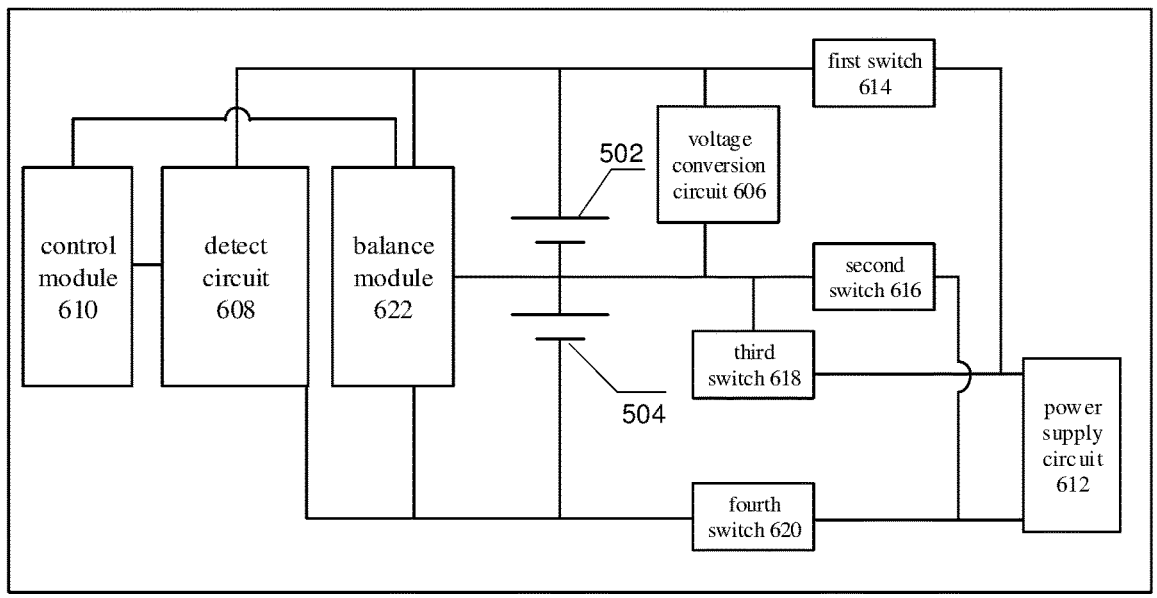
FIG. 12 is a structural diagram of another device according to an exemplary embodiment.

FIG. 12 is a schematic structural diagram showing another device to be charged according to an exemplary embodiment.

Referring to FIG. 12, the device to be charged 60 includes a first battery unit 502 and a second battery unit 504 connected in series, a voltage conversion circuit 606, a detect circuit 608, and a control module 610.

The voltage conversion circuit 606 is electrically connected to the first battery unit 602.

The detect circuit 608 is electrically connected to the first battery unit 602 and the second battery unit 604 for detecting the voltage of the first battery unit 602 and the second battery unit 604. The structure and working principle of the detect circuit 608 can refer to the detect circuits in the above-mentioned charging systems, and will not be repeated here.

The control module 610 is electrically connected to the detect circuit and the voltage conversion circuit to be connected, and is used for controlling the second battery unit 604 and the power supply circuit 612 in the device to be charged 60 when the detect circuit 608 detects that the voltage of the second battery unit 604 is greater than the preset first voltage threshold, so that the device to be charged 60 is supplied power through the second battery unit 604; the first battery unit 602 is controlled to connected to the power supply circuit 612 when the detect circuit 608 detects that the voltage of the second battery unit 604 is less than the first voltage threshold, such that the device to be charged 60 is supplied power through the first battery unit 602; and the control voltage conversion circuit 606 is controlled to boost the supply power voltage output by the first battery unit when the detect circuit 608 detects that the voltage of the first battery unit 602 is equal to or less than the first voltage threshold, so that the power supply voltage is greater than the first voltage threshold.

In some embodiments, the first battery unit 602 is a silicon negative lithium ion battery.

In some embodiments, the second battery unit 604 is a graphite negative lithium ion battery.

In some embodiments, the device to be charged 60 further includes a first switch 614, a second switch 616, a third switch 618, and a fourth switch 620. The first switch 614 and the second switch 616 are electrically connected to the first battery unit 602, and the third switch 618 and the fourth switch 620 are electrically connected to the second battery unit 604. The control module 610 controls the first switch 614 and the second switch 616 to turn on, controls the third switch 618 and the fourth switch 620 to turn off, so that the first battery unit 602 supplies power to the device to be charged 60; controls the third switch 618 and the four switches 620 to turn on, controls the first switch 614 and the second switch 616 to turn off, so that the second battery unit 604 supplies power to the device to be charged 60.

In some embodiments, the control module 610 is further configured to control the first battery unit to stop discharging when the detect circuit 608 detects that the voltage of the first battery unit is equal to or less than the preset second voltage threshold.

In some embodiments, the device to be charged 60 further includes a balance module 622, which is electrically connected to the first battery unit 602, the second battery unit 604, and the control module 610, for balancing the voltages between the first battery unit 602 and the second battery unit 604. The control module 610 is also used to control the balance module 622 to balance the voltages of the first battery unit 602 and the second battery unit after the first battery unit stops discharging, so that the voltages of the first battery unit 602 and the second battery unit 604 are equal.

In some embodiments, the control module 610 is further configured to control the balance module 622 to balance the voltages of the first battery unit 602 and the second battery unit 604 after the first battery unit 602 and the second battery unit 604 are cut off, so that the voltage of the first battery unit 602 is equal to the voltage of the second battery unit.

According to the device to be charged provided by the embodiments of the present disclosure, when a double battery cell connected in series is used, different discharge circuits are used to supply power to the device to be charged under different circumstances. When the voltage of the second battery unit reaches the first voltage threshold (such as the protection shutdown voltage set by the current smart terminal system), continue to use the first battery unit with large capacity to power the device to be charged, and convert the supplied voltage of the first battery unit through the voltage conversion circuit, to maximize the use of the capacity of the first battery unit, thereby increasing the energy density of the terminal device to be charged.

It should be noted that the block diagram shown in the above drawings is a functional entity, and does not necessarily correspond to a physically or logically independent entity. These functional entities may be implemented in the form of software, or implemented in one or more hardware modules or integrated circuits, or implemented in different networks and/or processor devices and/or microcontroller devices.

The exemplary embodiments of the present disclosure are specifically shown and described above. It should be understood that the present disclosure is not limited to the detailed structure, arrangement or implementation method described herein. On the contrary, the present disclosure intends to cover various modifications and equivalent arrangements included in the spirit and scope of the appended claims.

What is claimed is:

1. A method for charging and discharging control, applied to a device, wherein the device comprises a first battery unit and a second battery unit connected in series, a balance module, and a voltage conversion circuit electrically connected to the first battery unit, wherein the second battery unit only supplies power for the device, the method comprising:
    transferring power in the first battery unit to the second battery unit through the balance module when voltage of the second battery unit is equal to or less than a preset first voltage threshold;
    supplying power to the device through the second battery unit when the voltage of the second battery unit is greater than the preset first voltage threshold;
    supplying the power to the device through the first battery unit when the voltage of the second battery unit is equal to or less than the preset first voltage threshold; and boosting voltage output by the first battery unit through the voltage conversion circuit to control the voltage of the first battery unit to be greater than the preset first voltage threshold when the voltage of the first battery unit is equal to or less than the preset first voltage threshold;
    stopping discharge of the first battery unit when the voltage of the first battery unit is equal to or less than a preset second voltage threshold, wherein the preset second voltage threshold is less than the preset first voltage threshold; and
    stopping discharge of the second battery unit when the voltage of the first battery unit is equal to or less than the preset second voltage threshold;
    wherein the first battery unit is a lithium ion battery with a silicon negative electrode, and the second battery unit is a lithium ion battery with a graphite negative electrode.

2. The method according to claim 1, further comprising:
    charging the second battery unit; and
    balancing the voltages of the first battery unit and the second battery unit by the balance module after the charging of the second battery unit has been stopped, such that the voltage of the first battery unit is equal to the voltage of the second battery unit.

3. The method according to claim 2, further comprising:
    charging the first battery unit and the second battery unit; and
    balancing the voltage of the first battery unit and the second battery unit through the balance module after the charging of the first battery unit and the second battery unit has been cut off, so that the voltage of the first battery unit is equal to the voltage of the second battery unit.

4. A device, comprising:
    a first battery unit;
    a second battery unit connected with the first battery unit in series;
    a voltage conversion circuit electrically connected to the first battery unit;
    a detect circuit electrically connected with the first battery unit and the second battery unit and configured to detect voltage of the first battery unit and voltage of the second battery unit;
    a balance module electrically connected with the first battery unit and the second battery unit, and configured to balance the voltage of the first battery unit and the voltage of the second battery unit; and
    a control module electrically connected with the voltage conversion circuit, the detect circuit and the balance module, and configured to control the balance module to transfer power in the first battery unit to the second battery unit when the detect circuit detects that the voltage of the second battery unit is equal to or less than a preset first voltage threshold;
    wherein the control module is further configured to: control the second battery unit to charge the device when the detect circuit detects the voltage of the second battery unit is greater than the preset first voltage threshold; control the first battery unit to charge the device when the detect circuit detects the voltage of the second battery unit is equal to or less than the preset first voltage threshold; and control the voltage conversion circuit to boost the voltage output by the first battery unit through the voltage conversion circuit to control the voltage of the first battery unit to be greater than the preset first voltage threshold when the voltage of the first battery unit is equal to or less than the preset first voltage threshold;
    wherein the control module is further configured to control the first battery unit to stop discharging when the voltage of the first battery unit is equal to or less than a preset second voltage threshold, wherein the preset second voltage threshold is less than the preset first voltage threshold;
    wherein the control module is further configured to control the second battery unit to stop discharging when voltage of the first battery unit is less than or equal to a preset second voltage threshold;
    wherein the first battery unit is a lithium ion battery with a silicon negative electrode, and the second battery unit is a lithium ion battery with a graphite negative electrode.

5. The device of claim 4, wherein the control module is further configured to control the balance module to balance the voltage of the first battery unit and the second battery unit after charging of the second battery unit has been stopped, such that the voltage of the first battery unit is equal to the voltage of the second battery unit.

6. The device of claim 5, wherein the control module is further configured to control the balance module to balance the voltage of the first battery unit and the second battery unit after the charging of the first battery unit and the second battery unit has been cut off, so that the voltage of the first battery unit is equal to the voltage of the second battery unit.

* * * * *